Feb. 23, 1960 R. C. STRAWN 2,925,742
PLANETARY POWER TRANSMISSION SYSTEMS
Filed April 20, 1953 4 Sheets-Sheet 1

INVENTOR.
Raymond C. Strawn

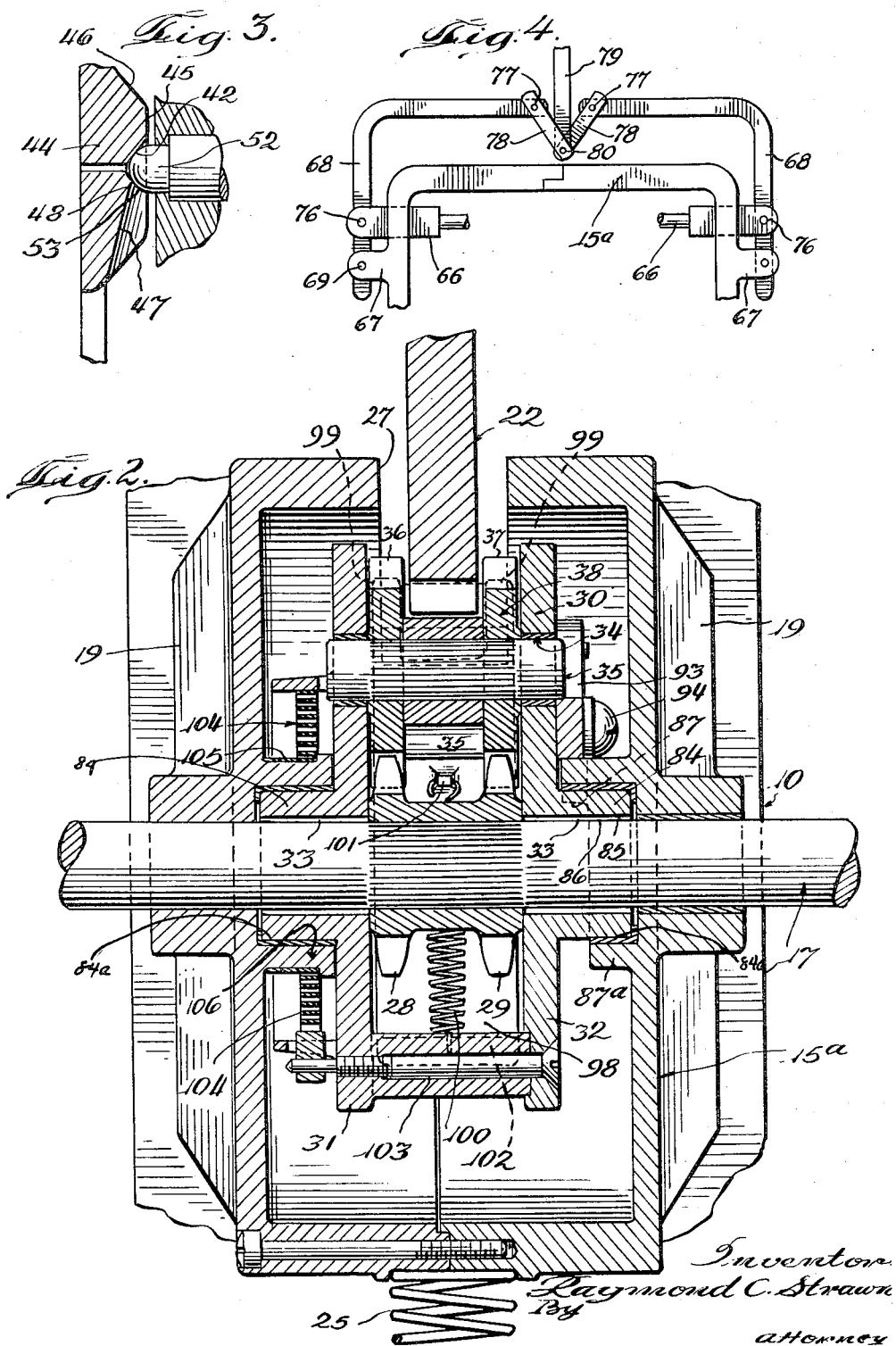

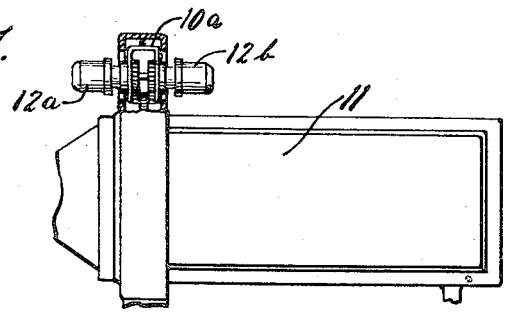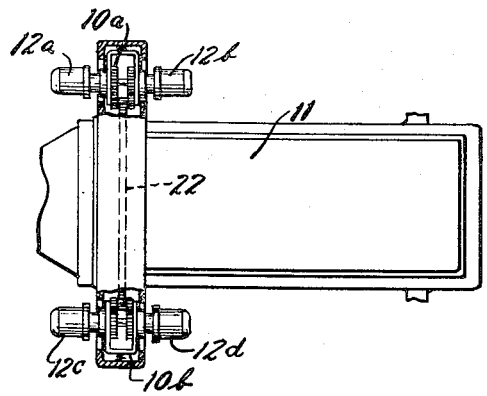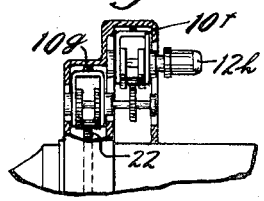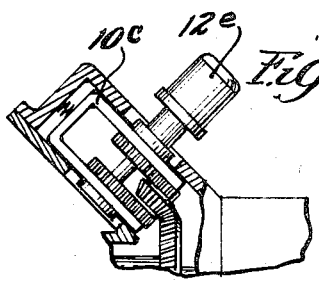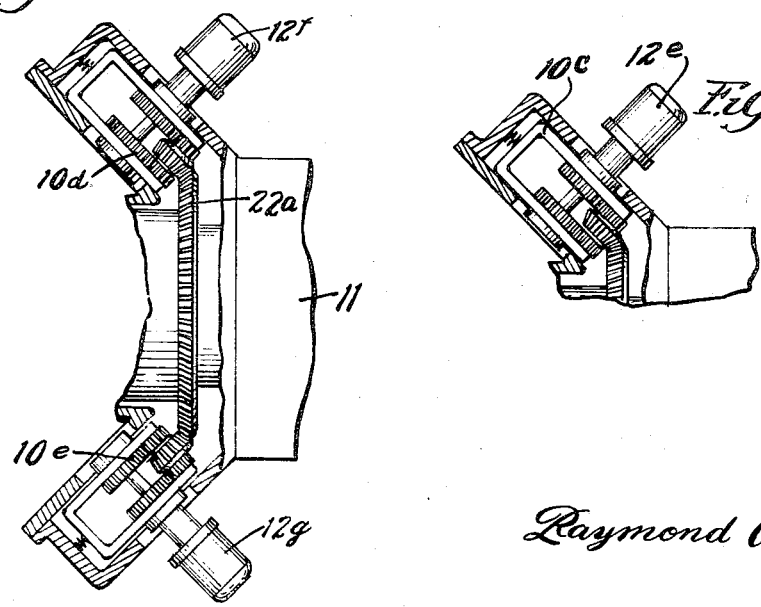

Feb. 23, 1960 R. C. STRAWN 2,925,742
PLANETARY POWER TRANSMISSION SYSTEMS
Filed April 20, 1953 4 Sheets-Sheet 4

INVENTOR.
Raymond C. Strawn

United States Patent Office 2,925,742
Patented Feb. 23, 1960

2,925,742
PLANETARY POWER TRANSMISSION SYSTEMS

Raymond C. Strawn, Chicago, Ill.

Application April 20, 1953, Serial No. 349,647

12 Claims. (Cl. 74—405)

The present invention relates to power transmission systems and in this instance the transmission disclosed has various movements and combinations of movement as it may planet only, or it may planet in combination with shiftable movement, or it may planet and oscillate in combination with shiftable movement, or it may oscillate only in combination with shiftable movement, or it may oscillate only without the shiftable movement, or it may move as a mass in combination with selection or the aforesaid movements between a sender and a receiver and it has other characteristics and functions which will be set forth as this specification is interpreted.

The present application relates to and is filed within one year from the issuance of my Patent No. 2,593,933, issued April 22, 1952, from an application filed July 3, 1947, and it is intended to cover herein all subject matter disclosed in my said patent, but not covered in the claims thereof.

In order to illustrate one example of the invention, I have selected the combination of the planetary oscillatory transmission device with an internal combustion engine and a motor starter; but the present device is capable of general application to many different uses, and may be employed for transmission of power in either direction through said device, and its uses are not limited merely to those illustrated and it is to be considered as applied between a sender and a receiver and adapted in such a manner as to provide engagement, driving, normal release, and overload release and wherein each of the above functions are a distinct, separate function, and may be applied in separate form or in combination of form. For example: when the device moves from a neutral position to an engaged position, starts the engine and returns to a neutral position, it has completed a normal operating cycle of function.

Accordingly, it is an object of the invention to provide a planetary system of the type set forth in my Patent 2,593,933, having control means as hereinafter described and claimed.

Other objects and advantages will be apparent from the following description and the accompanying drawings, in which similar characters of reference indicate similar parts throughout the several views.

Referring to the seven sheets of drawings accompanying the specification,

Fig. 2 is a fragmentary sectional view taken on the plane of the line 5—5 of Fig. 3, looking in the direction of the arrows;

Fig. 3 is a fragmentary sectional view showing a retaining mechanism for holding the planetary transmission device in driving position;

Fig. 4 is a fragmentary plan view of interconnecting mechanism by means of which the retaining members of Fig. 4 may be connected to be controlled by any suitable controlling device;

Fig. 7 is a diagrammatic plan view in partial section, illustrating the application of a pair of the present devices to a driven gear, such as an internal combustion engine, in parallel;

Fig. 8 is a similar view, showing the application of four of such devices in parallel, with one driven gear;

Fig. 9 is a fragmentary view showing the application of one of the devices to a driven gear at a common angle;

Fig. 10 is a similar view showing the application of two such devices to a driven gear at angles in common;

Fig. 11 is a fragmentary sectional view showing the application of two motor driven devices embodying the invention in series to a driven gear;

Figure 1:
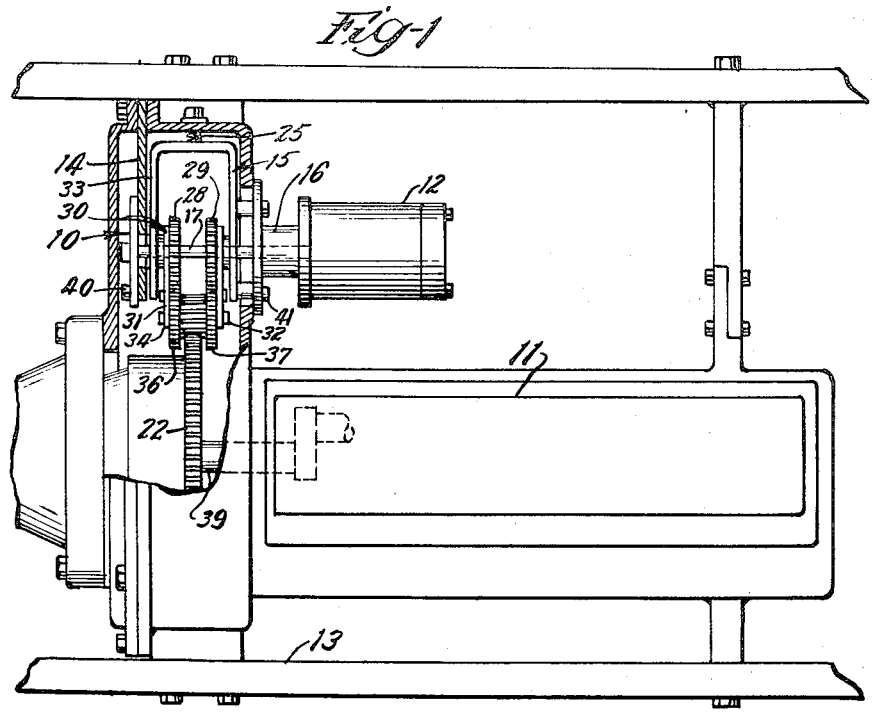
Fig. 1 is a top plan view of an internal combustion engine installation provided with an electric starting motor coupled to the engine flywheel by means of a planetary transmission device embodying my invention.

Referring to Fig. 1, this shows an example of the application of my planetary power transmission device 10 to an internal combustion motor 11, being powered by means of a motor starter 12.

The internal combustion engine 11 is carried by the chassis 13, which is also provided with a suitable frame member 14 for movably supporting the frame 15 of the planetary transmission device or coupling between the motor starter 12 and the engine 11.

The motor 12 may be carried by a bearing bracket 16, which is fixedly secured to the coupling frame 15, to move with it, as shown in Fig. 1.

The coupling frame 15 is mounted upon the bracket 14 for sliding motion by means of a key 19 on each side of the frame 15 slidably mounted in a groove in the bracket 14. This renders it necessary to provide suitable slots in the frame 14 to pass the main shaft 17, such as the slot 20, and other slots are provided for passing other devices which project laterally from the coupling frame 15.

The bracket 14 may be provided with a threaded bore (not shown) located diametrically oppositely to the flywheel 22, and the bore may contain a threaded plug having a socket 24 for a compression spring 25. The opposite end of the spring 25 seats in a socket 26 in the coupling frame 15 and resiliently urges this frame with its gears toward the flywheel.

In the event that one of the teeth of the flywheel gear 22 should strike head on with one of the teeth of the driving pinion or planetary element, or foreign matter clog the gear recesses, the spring 25 is adapted to give, to permit the entire frame 15 and its associated gears to move away from the flywheel momentarily, until the teeth mesh properly. Then the spring 25 maintains the frame 15 in the proper position for engagement of the driving and driven gears. This feature is not always required; where the driven member does become self-active or excessive foreign matter has access to the gearing, it is preferred.

Figure 6:
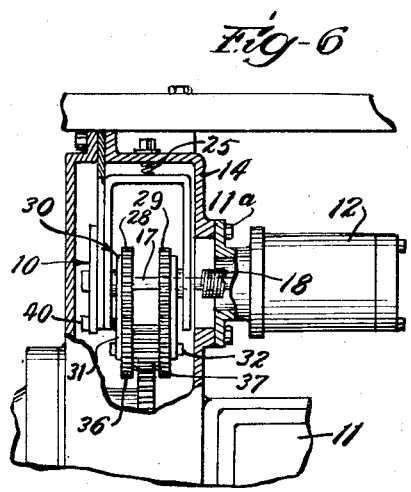
Fig. 6 is a fragmentary sectional illustration similar to Fig. 1 of the type of device in which the motor is fixedly mounted, but the planetary frame support is slidably mounted and the shaft has a universal joint between the transmission and the motor.

In Fig. 6 an alternative form of motor support is shown, in which the motor 12 is fixedly secured to frame 14 by bolts 12a. In this case the motor shaft is connected to shaft 17 by a resilient universal coupling 18, which permits translation of one shaft relative to the other for the purpose just described.

In Fig. 1 the frame 15 of the coupling is shown as an open frame, which is all that is necessary for the support of the parts.

Referring again to Fig. 1, the coupling 10 preferably includes a main shaft 17 provided with a pair of gears 28, 29 suitably keyed to the shaft and adapted to be rotated by it. The housing carries a planetary frame 30, which may consist of a pair of side frame members 31 and 32, each of which has a bearing bore 33 for receiving the main shaft 17 so that the planetary frame 30 is mounted for free rotation about the main shaft 17 on bearings carried by the housing.

The side frame members 31 and 32 of the planetary frame 30 are suitably joined together and are provided with bearing bores 34 for receiving the planetary shaft 35, which is rotatably mounted in said bores for free rotation, and the shaft 35 is also adapted to be revolved in a circular orbit about the main shaft 17, by virtue of its being carried by the planetary frame 30. This frame 30 has its own axis, which is coaxial with the main axis, but is carried on bearing surfaces which are displaced radially from the main shaft.

The planetary shaft 35 supports a pair of gears 36, 37, which mesh with the gears 28 and 29, respectively, and which are fixedly anchored to a planetary pinion or planetary element 38. Thus the gears 36—38 are secured together to rotate together, and the pinion 38 is located so that when the planetary frame 30 is located on a diametric line passing through the axis of shaft 17 and the axis of the crank shaft 39, pinion 38 and flywheel 22 are properly meshed for driving engagement.

Figure 5:
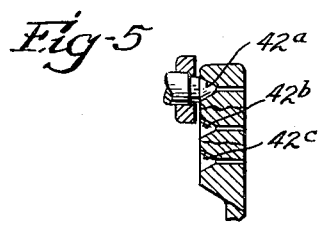
Fig. 5 is a fragmentary sectional view, showing a retaining plunger and a plurality of sockets which are disposed at different radii and on different radii for co-operation with the retaining plunger.

Suitable stops are provided, such as the end of the grooves containing the keys 19, Fig. 5, to limit the motion of the coupling frame 15 toward the flywheel so that the normal biased position of the frame 15 is one in which the pinion 38 and flywheel gear 22 mesh when the axes of the shafts 17, 35 and 39 and rotor axis are in alignment or in the same plane.

In this device when the shaft 17 is driven, its power may be transmitted either to the pinion 38, if the planetary frame 30 is held in fixed position, or, if the pinion 38 is held against movement, the power may be transmitted into rotation of the frame 30 about the shaft 17.

Therefore, in order to bring about the transmission of power through the pinion 38 to the flywheel it is necessary to provide the planetary frame 30 with means for holding this frame in the driving position just described. Such a means comprises the plungers shown in Fig. 1 at 40 and 41.

Referring now to Fig. 2, here the planetary drive mechanism is shown in greater detail. The side plates 31, 32 of the planetary frame may, as shown in Fig. 3, comprise substantially circular or oval plates provided at one side with a radially projecting body 44 of sufficient size to be provided with the socket 42 and with suitable camming surfaces leading to and from this socket in a peripheral direction.

Such a projecting body is shown in section in Fig. 3.

The socket 42 is preferably partially circular or conical so that it is adapted to cam the plunger 40 backward to permit the plunger to pass out of the socket upon application of a predetermined force.

Upon one side of the socket, that is, the top side, in Fig. 3, the full depth of the socket 42 is utilized, and the plunger must be cammed backward until it reaches a position flush with the outer surface 45 of a side plate, before the plunger is released from the socket.

Thereafter the plunger may pass peripherally across the surface 45 and may engage a camming surface 46 that permits the plunger to be ejected to its normal projecting position and enables the plunger to act on the planetary frame, tending to cause a rotation of the planetary frame in the direction in which it is moving. This feature requires less pressure on the gear retarder, since it aids in the transfer of motion from the gears to the planetary frame.

A full depth of the socket 42, as described, reacting in a camming manner against the plungers, is preferably employed as a retaining means for holding the planetary frame in the driving position against over-load; and the camming action just described is that which is brought about by overload, which may cause the plungers to be cammed out of the sockets 42, to relieve the mechanism from the strains caused by overload.

Then the planetary frame is free to rotate on its own axis about the main shaft 17, until it reaches a new driving position; but such rotation is preferably assured by providing a means for gradually transferring the torque of the pinion 38 to the planet frame, as will be further described.

Referring again to Figs. 1 and 3, a gradually sloped groove or camming surface 47 on a side plate 31 or 32 adjacent, and leading to a socket 42, is located on the leading side of the socket 42; that is, the side toward which the plungers move when they are moving into the sockets 42.

This camming surface 47 gradually cams the plungers 40, 41 backward, due to the load draft of the driven member and power torque, until they pass over a hump 48 into the sockets such as the socket 42. Since the hump 48 is of less height than the outer rim of the socket 42, the plungers 40 or 41 may be cammed backward over the hump 48 more easily than they can pass forward or upward in Fig. 3.

This characteristic is preferably employed for effecting a release of the mechanism from the engine when the engine becomes a power source. Whenever the engine starts while the motor 12 is driving the main shaft 17, the plungers 40, 41 are adapted to be cammed backward by the hump 48, and thus the planetary frame may be released for oscillation, thus relieving the pinion 38 and other parts from the strain caused by the forward surge of the started engine.

Various forms of plunger heads and sockets may be employed, and Fig. 3 shows a different form of plunger head.

Referring to Fig. 3, the plunger head 52 in this case has a partially spherical end surface 53.

The plungers 40, 41 may thus be provided with different types of camming heads.

In order to provide for the manual or automatic control of these plungers, each plunger is preferably provided with a threaded bore not shown for receiving the threaded end of a connecting rod 66. Thus the connecting rods may be used for retracting the plungers 40, 41 at will to release the retaining mechanism that is holding the gears in driving engagement.

Referring to Fig. 4, this shows a connecting mechanism by means of which both plungers may be simultaneously controlled. A fragment of the housing is shown, and this housing is provided with outwardly projecting pivot ears 67.

An angle lever 68 is pivotally mounted at 69 on each pivot ear. The angle levers 68 are pivotally connected by means of a pin and slot at 70 to the pull rods 66. The end of each angle lever is connected pivotally at 77 to a link 78. The links 78 are pivotally connected together and to a connecting rod 79 by means of a pintle 80.

Figure 13:
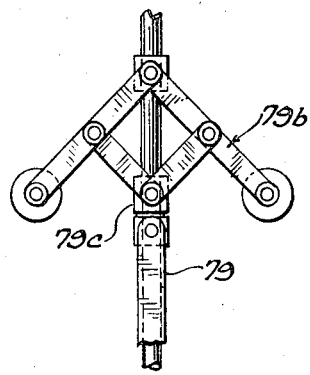
Fig. 13 is a fragmentary elevational view showing how a lever system for the planetary system may be controlled through the connecting rod 79 by a speed responsive device.

Pulling upward on the rod 79 causes the angle levers 68 to spread and to pull both plunger rods 66 outward. The motion of the connecting rod 79 may be controlled by any suitable controlling devices, such as, for example, a speed responsive element, a manual lever, a vacuum control unit, a magnetic mechanism, or a pressure responsive device. Referring to Fig. 13, this is a fragmentary illustration of a flyball governor 79b, the sliding member 79c of which is arranged to control the movement of rod 79 and through it plungers 40, 41.

Figure 14:
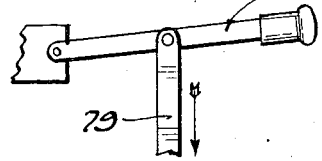
Fig. 14 is a fragmentary elevational view showing how the control rod 79 may be controlled by a manual device.

Referring to Fig. 14, this is a fragmentary view showing how a manual lever 79d can be arranged to control the rod 79 and plungers 40, 41.

Figure 15:
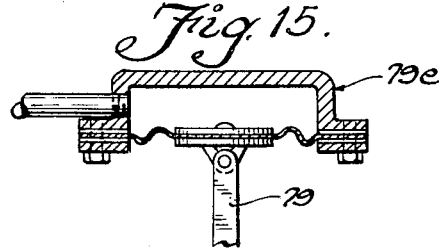
Fig. 15 is a fragmentary sectional view showing how the plungers may be controlled through the rod 79 by means of a vacuum control unit.
Figure 16:
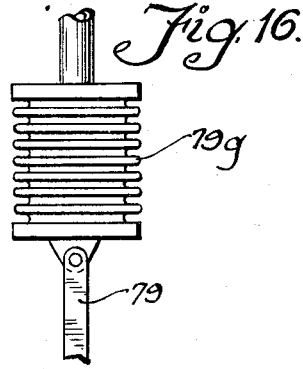
Fig. 16 is a fragmentary elevational view showing how the plungers controlled by rod 79 may be controlled by a pressure responsive device.
Figure 17:
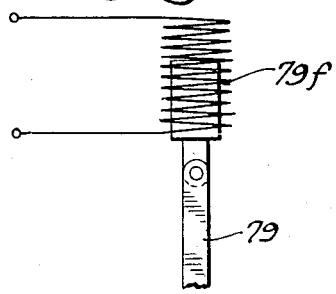
Fig. 17 is a fragmentary diagrammatic view showing how the connecting rod 79 may be controlled by a magnetic mechanism.

Referring to Fig. 15, this is a fragmentary illustration in which rod 79 is controlled by the diaphragm of a vacuum control unit 79e. Referring to Fig. 17, this is a diagrammatic illustration of a control unit in which the rod 79 is controlled by a magnetic mechanism 79f, comprising a solenoid and plunger. Referring to Fig. 16, this is a fragmentary view in which the rod 79 is controlled by a pressure responsive bellows 79g.

Thus the present power transmission device may be controlled and disconnected by any of these controlling units merely by withdrawing the plungers 40, 41, which hold the planetary frame in the driving position; and when these plungers automatically are kicked open, they can trip safety units outside too.

When the planetary frame 30 and pinion 38 are in the driving position shown in Fig. 1 and the frame 30 is being held in such position by the plungers 40, 41, all power must be transmitted to the flywheel 22 through the pinion 38.

Upon the occurrence of an over-load or a backfire or upon the withdrawal of the plungers 40, 41 manually or by some controlling unit, the rotative forces applied to the pinion 38 either by the flywheel or the starter motor 12 will cause the planetary frame 30 to rotate on its own axis about the shaft 17, until the pinion 38 no longer engages the flywheel gear 32. Then both the planetary pinion 38 and the planetary frame 30 would be free to rotate; and in order to insure the rotation of the planetary frame around into position for driving engagement again, the mechanism is preferably provided with a means for retarding the pinion 38 against rotation except when it is in driving engagement with the flywheel gear 22.

For example, as seen in Fig. 2, the side plate 32 is preferably provided with an axially projecting cylindrical hub 84, which may have an enlarged bore 85 providing a clearance 86 about shaft 17. Side plates 31, 32 are given bearing support at the outside of their hubs 84, in bearing bores in housing 15a. Thus shocks on the planetary system are transmitted to the housing instead of the main shaft 17.

In illustrating the operation of the device, Figs. 1 and 2 show a bifurcated retarding lever 98, one of its legs being shown at 99, so that these legs may straddle the flywheel gear 22. The legs 99 are in position to engage the teeth of the two gears 36 and 37, and thus to retard these gears whenever a cam follower of a type shown in my Patent 2,593,933 is in a suitable position as therein described.

The follower, further to afford a setting for the invention herein set forth, is preferably urged into engaging position with a suitable cam (not shown) and the retarding lever 98 also urged toward the gears, which its legs 99 are intended to engage by means of a spring, such as the spring 100, one end of which is hooked in an aperture in a lever side extension 101, and the other end of which is hooked in a spring-supporting member 102, which is carried by a transverse bolt on the rotor housing.

The transverse bolt 103 extends from one side plate 32 to the other side plate 31, and also serves as a fixed abutment for supporting the outer end of a spiral spring 104, which is located on the other, or left side of the device.

The spiral spring 104 has convolutions of gradually decreasing radius, until its innermost turns 105 are of such size that they frictionally engage an inwardly extending hub 106 carried by the left side of the housing 15a.

The spiral spring 104 has its inner helical coils in frictional engagement with the hub 106 in such manner that when the planetary frame 30 is released, due to an over-load, the planetary frame 30 rotates in such manner as to rotate the fixed abutment 103 of the spring 104; but when the planetary frame 30 is released in the opposite direction by a back-fire or a kick-back, the spring rotates on the hub 106 with the planetary frame.

The spring urges against engagement of pinion 38 and the driven member. When the mechanism is still, spring 104 constantly urges pinion 35 away from gear 22. When the power source is energized, it overcomes this urge and shifts pinion 35 approximately into engagement with gear 22.

Then, if gear 22 is moving from backward inertia, it will carry pinion 35 past its regular driving position. It also starts unwinding spring 104, causing expansion of spring 104. This expansion is checked by annular lip 106a on the planetary frame, causing the expansive action to reverse through the spring to its hub wound portions, thus expanding them and somewhat loosening their grip on the hub; and thereafter the spring follows the rotation of the planetary frame, thus resetting itself under tension, and permitting the spring to choose its proper stopping place. Housing 106a may be constructed to discharge refuse.

Figure 12:
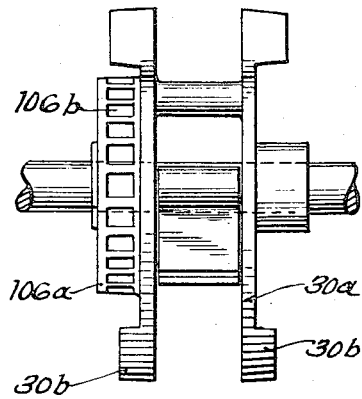
Fig. 12 is a fragmentary elevational view of a planetary frame housing showing how it may be counterbalanced and how it may be constructed to discharge refuse.

Fig. 12 shows the planetary cage 30a provided with housing 106a for the spring 104, in which the housing is provided with a multiplicity of apertures 106b for discharging refuse which might otherwise interfere with the operation of the spring 104.

Referring to Fig. 5, this modification illustrates the use of a plurality of driving pinions of different size, each of which is located at a different point circumferentially of the main shaft 17, and each of which is adapted to mesh with the flywheel gear 22.

In order to hold such gears in driving engagement, the outside of the planetary frame 30a is preferably provided with a plurality of sockets 42a, 42b, and 42c. These sockets are to be engaged by plungers which are carried on different radii by the side wall of the housing 15a; or if the holding values of the plungers are to be the same to each assembly, only one set is needed.

Thus each plunger will only engage its proper socket, also the leverage between the driving and driven member is varied, since the stations measure differently from the main axis.

Since the driving pinions are of different sizes, and the gears are at different radii, it will be evident that this transmission may be used for providing different speeds and leverages between the prime mover and the driven member, or varied speeds.

The operation of my transmission is as follows:

The planetary frame 30 rotates or oscillates on its own axis about the main shaft 17, carrying with it the driving pinion 38, which describes a revolution in a circular orbit. When the main shaft 17 is driven by the starter motor 12, this motion may accomplish two different things. (First) If the planetary frame 30 is held fixed, shaft 17 rotates gears 28 and 29, which engage and rotate gears 36 and 37, which carry with them pinion 38.

Pinion 38 then rotates the drives gear 22. (Second) If the planetary frame 30 is permitted to rotate, and if the shaft rotates clockwise, looking at Fig. 1 from the right side, gears 28 and 29 rotate clockwise, gears 36 and 37 rotate counterclockwise, pinion 38 rotates counterclockwise, pinion 38 cannot drive gear 22 because as the teeth of the pinion tend to urge the teeth of gear 22 clockwise, the reaction on the frame 30 causes the frame 30 to rotate counterclockwise, causing the pinion 38 to walk out of engagement with the gear 22.

The momentum which is gained by frame 30 is usually sufficient to carry frame 30 through a complete rotation; but in any event, when the pinion 38 gets out of engagement with the driven gear 22, pinion 38 is locked against rotation by the tooth retarder 98 until the frame 30 makes a complete rotation and brings the pinion 38 again into engagement with the gear 22.

The arrangement of the gearing and its assembly in the planetary frame are such as to permit free pivotal entry and escape from the flywheel 22, against the rotation of the driving member. It also permits the over-load structure to function properly. The coupling may also be reversed in function to perform as an overdrive connection.

If the pinion 38 is in the position of Fig. 1, engaging the flywheel gear 22, then the flywheel gear may be driven by the starter motor 12 as long as the planetary frame 30 is held fixed.

The planetary frame 30 is so held by the plungers 40 and 41 engaging in sockets such as socket 42.

Whenever an over-load occurs, the plungers 41, 42 are cammed outward by the camming surfaces of the sockets, until the plungers pass over the flat surface 45, and the plungers ride on the camming surface 46. Then the springs of the plungers give the rotor an additional rotative impulse to coincide with the main shaft. When the camming force exerted on the ends of the plungers becomes strong enough to move the plungers relative to their sockets, the power torque is applied to the planetary frame about the axis of shaft 17 and runs the pinion 38 out of engagement with the gear 22. The inclined camming surfaces 46, acted on by the plungers, tends to rotate the planetary cage away from the plungers by virtue of the expansive action of the plungers, tending to match the speeds of the driving member 12 and the planetary frame 30.

Spring 100 is constantly urging gear retarder 98 toward engagement. This engagement urges the follower toward its cam; and as soon as the over-load or any other rotative force exerts sufficient torque on the planetary frame 30 to cause the sockets 42 to cam the plungers 40, 41 out of the sockets, then the planetary frame 30, urged by the driven member, rotates far enough to carry the pinion 38 out of engagement with flywheel gear 22. At the same time the follower, as described in the said Patent 2,953,933, causes a slight rotation of the shaft 94, which rotates the gear retarder 98 until its legs 99 engage and resiliently retard the gears 36 and 37 and apply this effort to the rotor housing, since the retarding means is operably anchored to this rotor housing at 94.

Thus the pinion 38 and gears 36 and 37 are resiliently retarded against rotation as soon as the pinion 38 gets out of engagement with the flywheel gear 22.

When the pinion 38 and gears 36, 37 are retarded against rotation, sufficient power applied to the shaft 17 will cause a rotation of the planetary frame 30; and this further rotation of the planetary frame will cause it to make a complete revolution until the pinion 38 again comes back into driving engagement and is released by its retarding lever 98 because the follower has again ridden up on the cam surface 88.

The spacing of the shafts 17, 35, and 39 and the size of the gears 22 and 38 is such that when these shafts have their axes in the same plane the gears 38 and 22 mesh; and the planetary frame 30 may then by its rotation move the pinion 38 into or out of engagement with the gear 22. If the teeth of pinion 38 and gear 22 meet head on, then the spring 25 gives, and frame 15 permits the pinion 38 to recede from the gear 22 momentarily until their teeth mesh.

Whenever the starter motor 12 is driving and the engine 11 back-fires, the plungers 40, 41 are cammed over the full hump in the opposite direction, and the pinion 38 is rotated out of driving engagement with the flywheel gear 22.

When the starter motor is driving and the engine starts, the plungers 40, 41 are cammed over the lower hump; and the engine, becoming a source of power, rotates the pinion 38 out of driving engagement with the flywheel.

The rotation of the planetary frame 30 in this case is opposite to its over-load rotation and opposite to the desired normal rotation of the frame; and therefore the spring 104 has its clutch coils 105 clutching the hub 106 until the spring 104 is tensioned over a rotation of about one hundred and eighty degrees or less.

It will thus be observed that the present planetary transmission is adapted to effect an automatic release between the starter motor and the engine flywheel upon over-load or upon back-fire, or when the engine starts under its own power. It is also adapted to bring the driving gears automatically into re-engaging position over and over again, without possibility of damage to any of the parts.

If the over-load continues, it will be sufficient to cause the rotor to cam past the plungers 40, 41 again and again. Whenever a back-fire takes place and a reverse action is brought to bear against the gears, the device also effects an automatic release and complete disconnection between the starter motor and engine; and after a short lapse of time the transmission is again connected between the starter motor and the engine in driving position.

The present device is simple; it has a minimum number of parts, and it is adapted to be used for a long period of time without any possibility of the gears locking.

These devices may be applied, in series, in parallel, in common, in tandem, at an angle, at angles in common, and in the singular and plural form or any combinations of the above application in the singular or plural form. The singular or plural form terms are also meant to apply to the coupling's structure proper and to the coupling's applications. For example, in Figure 1, the coupling proper is constructed in the plural form since it is driven on each side and the movable frame 30 is held on each side and said frame is piloted on each side and the controlling means moving with this frame 30 applies control to each side. This particular type of coupling is quite durable and quite applicable for heavy, hard service, and has heavy power transfer potentialities as illustrated in Fig. 18. It is also adaptable for a replacement unit to be applied to gear wheels having damaged ends on its gear teeth. Fig. 18 is also an example of plural application with the devices located at half circle intervals of 180 degrees. The terms in series and in parallel respectively also apply to the manner power is applied to the starting motors.

Referring to Fig. 7, this shows my transmisison 10a driven by two motors 12a, 12b in parallel on the same shaft.

Referring to Fig. 8, this shows two of the driving assemblies of Fig. 7 in parallel with relation to gear 22. Motors 12a and 12b drive gear 22 through transmission 10a. Motors 12c and 12d drive the same gear 22 through transmission 10b.

Referring to Fig. 9, this shows motor 12e and transmission 10c arranged at the common angle of 45 degrees.

Referring to Fig. 10, this shows gear 22a driven by two devices in parallel and arranged at angles in common. In this case the motors are 12f and 12g, which drive bevel gear 22a through transmissions 10d and 10e, respectively.

Referring to Fig. 11, this shows a single motor 12h driving gear 22 through two of my transmissions 10f and 10g in series.

The present device can also be counterbalanced to avoid vibration, whenever such a condition may occur. Such a counterbalance for the planetary housing 30a is illustrated in Fig. 12, where this housing is provided with counterbalance weights 30b.

The driving gears may be meshed together without damage when either or both the prime mover or driven member are rotating at a high speed. It is not necessary to process the end of the gears for longitudinal meshing action; and the presence of dirt or other foreign matter upon the gears or other parts will not affect their operation.

The present power transmission may be controlled in regard to disconnection by any kind of controlling devices which are adapted to actuate or withdraw the plungers that retain the planetary rotor in the driving position. The motion of the coupling into driving engagement being accomplished automatically, it is only necessary to control the plungers for disengagement of the drive.

A very important feature of the present invention is its use, in driving a generator 12 by means of an internal combustion engine 11, as distinguished from the starting of the internal combustion engine by means of an electric motor 12, as covered by said prior patent.

Another practical application of this invention is driving automatic tapping and reaming machines and such like because if the taps or reamers should suddenly seize it would release without damaging the working tools or bits.

Three separate manual levers, as shown in Fig. 12, may be employed in a multiple speed device herein described and the same is true of the use of each of the controls shown in Figs. 13-17, these controls being adapted to be attached directly to the rods 66 if desired.

The present application is intended to cover all of the combinations and permutations of the controlling devices of Figs. 13-17.

The present application is intended to include all patentable subject-matter not covered by my said prior patent.

While I have illustrated a preferred embodiment of my invention, many modifications may be made without departing from the spirit of the invention, and I do not wish to be limited to the precise details of construction set forth, but desire to avail myself of all changes within the scope of the appended claims.

Having thus described my invention, what I claim as new and desire to secure by Letters Patent of the United States, is:

1. In a power transmission system, the combination of a support, a driven gear, a drive shaft and a planetary frame rotatably mounted to rotate about the axis of the drive shaft, a plurality of planetary driving pinions of different size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, and holding means carried by said support for releasably engaging said planetary frame, for holding the planetary frame in driving position for any one of said planetary pinions, and an electric switch controlled by said holding means and adapted to cut off power upon rotation or oscillation of said planetary frame.

2. In a power transmission system, the combination of a support, a driven gear, a drive shaft, and a counterbalanced planetary frame rotatably mounted to rotate about the axis of the drive shaft, a plurality of planetary driving pinions of different size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, holding means carried by said support for releasably engaging said planetary frame, for holding the planetary frame in driving position for any one of said planetary pinions, said counterbalance effecting a dynamic and static balance of said planetary frame.

3. In a power transmission system, the combination of a support, a driven gear, a drive shaft, and a planetary frame rotatably mounted to rotate about the axis of the drive shaft, a plurality of planetary driving pinions of different size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, holding means carried by said support for releasably engaging said planetary frame, for holding the planetary frame in driving position for any one of said planetary pinions, and a manual leverage means connected to each of said holding means for effecting a manual control of the release of said holding means to permit the planetary frame to oscillate or rotate.

4. In a power transmission system, the combination of a support, a driven gear, a drive shaft and a planetary frame rotatably mounted to rotate about the axis of the drive shaft, a plurality of planetary driving pinions of different size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, holding means carried by said support for releasably engaging said planetary frame, for holding the planetary frame in driving position for any one of said planetary pinions, and a vacuum control means operatively connected to said holding means and controlling the rotation and oscillation of said planetary frame.

5. In a power transmission system, the combination of a support, a driven gear, a drive shaft and a planetary frame rotatably mounted to rotate about the axis of the drive shaft, a plurality of planetary driving pinions of different size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, holding means carried by said support for releasably engaging said planetary frame, for holding the planetary frame in driving position for any one of said planetary pinions, and a pressure responsive means operatively connected to said holding means and adapted to cause said planetary frame to rotate or oscillate responsive to a predetermined pressure.

6. In a power transmission system, the combination of a support, a driven gear, a drive shaft and a planetary frame rotatably mounted to rotate about the axis of the drive shaft, a plurality of planetary driving pinions of different size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, holding means carried by said support for releasably engaging said planetary frame, for holding the planetary frame in driving position for any one of said planetary pinions, and a magnetic means operatively connected to said holding means for controlling rotation or oscillation of said planetary frame responsive to energization of said magnetic means.

7. In a power transmission system, the combination of a support, a driven gear, a drive shaft and a planetary frame rotatably mounted to rotate about the axis of the drive shaft, a plurality of planetary driving pinions of different size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, holding means carried by said support for releasably engaging said planetary frame, for holding the planetary frame in driving position for any one of said planetary pinions, and an electrical switch operatively connected to said holding means to be actuated responsive to the movement of said planetary frame relative to driving position.

8. In a planetary control device, a driven gear, a unit comprising a driving planetary gear meshing with the driven gear, a driving shaft, a gear carried by said driving shaft, a planetary frame rotatably mounted about said driving shaft, said planetary gear being rotatably mounted upon said planetary frame for rotation or oscillation, an intermediate gear meshing with the gear on said driving shaft and driving said planetary gear, a motor driving said drive shaft, and a second similar unit having its planetary gear meshing with said driven gear and having a separate motor driving the drive shaft of said second unit, each of said motors carrying its proportion of the load on said driven shaft.

9. In a planetary control device, a driven gear, a unit comprising a driving planetary gear meshing with the driven gear, a driving shaft, a gear carried by said driving shaft, a planetary frame rotatably mounted upon said driving shaft, said planetary gear being rotatably mounted upon said planetary frame for rotation or oscillation, an intermediate gear meshing with the gear on said driving shaft and driving said planetary gear, a motor driving said drive shaft, and a second similar unit having its planetary gear meshing with a gear carried by said driving shaft, the said units operating in tandem on said driven gear.

10. In a planetary control device, a driven gear, a unit comprising a driving planetary gear meshing with the driven gear, a driving shaft, a gear carried by said driving shaft, a planetary frame rotatably mounted about said driving shaft, said planetary gear being rotatably mounted upon said planetary frame for rotation or oscillation, an intermediate gear meshing with the gear on said driving shaft and driving said planetary gear, a motor driving said drive shaft, and a second similar unit having its planetary gear meshing with said driven gear and having a separate motor driving the drive shaft of said second unit, each of said motors carrying its proportion of the load on said driven shaft without overload on either motor, the said planetary gears comprising bevel gears and said driven gear comprising a bevel gear, the said devices operating at a common angle.

11. In a speed change transmission, the combination of a support, a driving shaft and a driven shaft, one of said shafts being in driving and driven relation to a first gear, and the other of said shafts being in driving and driven relation to a planetary frame having a plurality of planetary gears rotatably mounted on said frame and adapted to be brought into mesh with said first gear, said planetary gears being of different size for different speeds, operative gear connections between each planetary gear and the said other of said shafts, said gear connections also effecting a change of speed by virtue of their size, holding means for holding said planetary frame selectively with any one of said planetary gears in driving relation, and manual means for controlling said holding means to permit the release of said holding means to change from one planetary gear driving position to another planetary gear driving position to effect a change of speed.

12. In a power transmission system, the combination of a support, a driven gear, a drive shaft and a planetary frame rotatably mounted to rotate about the axis of the drive shaft, a plurality of planetary driving pinions of different size rotatably size rotatably mounted upon said planetary frame to mesh with said driven gear upon revolution or oscillation of said planetary pinions and operative driving connections between said drive shaft and each of said planetary pinions so that said driven gear may be driven selectively by any one of said planetary pinions to change the speed ratio at will, holding means carried by said support for releasably engaging said planetary frame, for holding the planetary frame in driving position for any one of said planetary pinions.

References Cited in the file of this patent

UNITED STATES PATENTS

| | | |
|---|---|---|
| 2,046,412 | Reynolds | July 7, 1936 |
| 2,434,480 | Anderson | Jan. 13, 1948 |
| 2,593,933 | Strawn | Apr. 22, 1952 |